United States Patent Office 3,134,755
Patented May 26, 1964

3,134,755
POLYURETHANE PLASTICS PREPARED FROM THE REACTION PRODUCT OF AN ALDEHYDE AND AN OXYALKYLATED AROMATIC AMINE
Erwin Müller, Otto Bayer, Günther Braun, and Hans Scheurlen, all of Leverkusen, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed May 16, 1958, Ser. No. 772,643
Claims priority, application Germany May 16, 1957
(Filed under Rule 47(a) and 35 U.S.C. 116)
8 Claims. (Cl. 260—72.5)

This invention relates generally to the preparation of polyhydroxy compounds and more particularly to the production of polyurethane plastics therefrom.

It has been proposed, heretofore, to prepare polyurethane plastics from organic polyisocyanates and organic polyhydroxy compounds containing terminal hydroxyl groups. The organic polyhydroxy compounds containing terminal hydroxyl groups which have been used are linear or branched hydroxyl terminated polyesters, linear or branched hydroxyl terminated polyester amides, linear or branched hydroxyl terminated polyethers, linear or branched polythioethers, linear or branched polyacetals with terminal hydroxyl groups and hydrogenated copolymers of carbon monoxide and ethylene. Cross-linking agents may also be used such as, water, amines, glycols and amino alcohols. The polyurethane plastics produce many different types of materials including: foam products, lacquers, adhesives, textile coatings, elastomeric products and casting resins. The polyester-polyisocyanate reaction mixture is characterized by very good mechanical properties, however, the reaction mixture has the disadvantage in that the polyurethane products contain ester groups which are able to saponify. The result therefore is that articles having a long effective life or those which are permanently exposed to elevated temperatures and high air humidity have a degradation reaction which lowers the otherwise very favorable properties of the material.

It is therefore, an object of this invention to provide an improved process for making polyurethane plastics. Another object is to provide novel polyhydroxy condensation compounds useful for making polyurethane plastics. A further object is a novel method of preparing polyhydroxy condensation compounds. A still further object is to provide novel polyurethane plastics having improved physical properties.

Generally speaking, the foregoing objects and others are accomplished in accordance with this invention by providing a method for producing aromatic compounds having the formula:

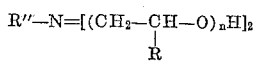

or

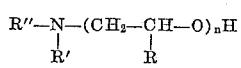

in the molecule, wherein R represents hydrogen or a methyl group, $n$ is a whole number from 1 to 10, R' represents an alkyl, cycloalkyl, acyl or aralkyl group and R'' represents an aryl radical. These compounds may be reacted with an aldehyde to produce an hydroxyl terminated compound adapted to be reacted with an organic polyisocyanate to form a polyurethane palstic and such processes are contemplated by the invention.

In general, the invention may be carried out, for example, by reacting in known manner an alkylene oxide and an aromatic amine which reaction, if necessary, is carried out in the presence of a basic catalyst. Depending upon the duration of the oxyalkylation reaction, different addition products may be obtained. The reaction product having aliphatic hydroxyl groups is then reacted with an aldehyde, preferably with formaldehyde by heating, if necessary, in the presence of an acid catalyst. The aldehyde condensation product may then be reacted with an organic polyisocyanate and if necessary cross-linking agents and other auxiliary substances to form polyurethane plastics.

The invention may be carried out, for example, by several different series of manipulative steps. One such series of steps involves reacting alkylene oxides and aromatic primary amines in the presence, if necessary, of a basic catalyst. The addition products of one mol of aromatic primary amine with two or more mols of alkylene oxide may be obtained depending on the duration of the oxyalkylation reaction. The reaction is preferably performed at elevated temperatures more specifically within the range of about 80° C. to about 150° C. The products which may be obtained are the di-, tri-, tetra-, penta-, or hexaoxyethyl anilines. The aromatic compounds produced by this method have the following general structure wherein the grouping

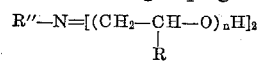

is contained at least once in the molecule, and R represents hydrogen or a methyl group, $n$ is a whole number from 1 to 10 and R'' is an aryl radical.

Another series of steps of carrying out the invention involves reacting alkylene oxides and aromatic secondary amines. The reaction may, if necessary, be carried out in the presence of basic catalyst. Here too, addition products of 1 mol of secondary amine with two or more mols of alkylene oxide may be obtained depending on the reaction time. The reaction is preferably performed at elevated temperatures more specifically within the range of about 80° C. to about 150° C. The products which may be obtained are the N-mono, di-, tri-, and tetra-oxyalkylation products. The aromatic compounds produced by this method have the following general formula wherein the grouping

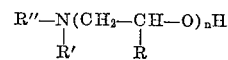

is contained at least once in the molecule, and R represents hydrogen or a methyl group; $n$ is a whole number of from 1 to 10; R' represents an alkyl, cycloalkyl, aryl or aralkyl group and R'' is an aryl radical.

These aromatic compounds contain aliphatically bonded hydroxyl groups and an aromatic ring system. These aromatic compounds are then reacted with an aldehyde and by heating, if necessary, after adding an acid catalyst. The reaction is performed at somewhat elevated temperatures, for instance within the temperature range of from 40° C. to 120° C. During the reaction with the aldehyde, water is liberated and is distilled off. It is also preferable to carry out the condensation in a stream of neutral gas such as carbon dioxide or nitrogen.

The condensation reaction may also take place in a solvent. An organic solvent may advantageously serve as an entraining agent to remove azeotropically the water of condensation formed. Preferred temperatures for the azeotropic distillation are from about 80° C. to about 150° C. When the aldehyde used is formaldehyde, the rection may take place in an aqueous phase and all the water distilled off after the condensation reaction.

Still another method for carrying out the condensation for the production of polyhydroxy compounds to be used in the present invention involves the acid condensation of an aryl amine such as, for example, aniline with formaldehyde with subsequent oxylkylation of the resulting aniline resin containing amino groups.

It is known that compounds having aliphatically bonded hydroxyl groups and compounds having aromatic ring system are capable of reacting with formaldehyde. Compounds having aliphatically bonded hydroxyl groups form polyacetals on reaction with formaldehyde in the presence of acid catalyst. When hexanediol is reacted with formaldehyde, for example, in the presence of an acid catalyst, polyhexamethylene formal of a high molecular weight is produced. Aromatic compounds, for example, may also react with formaldehyde in the presence of an acid catalyst. Dimethyl aniline may react in a 2:1 mol ratio with formaldehyde in the presence of an acid catalyst to form 4,4'-(dimethyl-amino)-diphenyl methane.

The aromatic compounds produced according to the present invention which contain aliphatically bonded hydroxyl groups provide the necessary preliminary conditions for both types of reactions. It has been observed, however, that the action of aldehydes on the aromatic compounds containing aliphatically bonded hydroxyl groups in the presence of acid catalyst produces almost exclusively a nuclear linking by way of methylene groups and the aliphatically bonded hydroxyl groups are left unreacted.

The molecular weight of the condensation products formed depends on the proportions of the reactants employed. Condensation products having a low molecular weight are formed predominately by the reaction of two mols of the aromatic compound having aliphatically bonded hydroxyl groups and one mol of the aldehyde. High molecular weight condensation products are obtained by reaction of 1 mol of the aromatic compound and one mol of aldehyde. Since water is liberated in the course of the condensation reaction, the required degree of condensation can be determined on the basis of the quantity of water liberated. Even the highly viscous condensation products of relatively high molecular weight compounds have a hydroxyl content which corresponds substantially to that of the initial components, taking into account the quantity of aldehyde used and the amount of water liberated. The polyhdroxy compounds are preferred to have a hydroxyl number ranging from 150 to about 400.

The condensation products produced by reacting secondary aromatic amines, alkylene oxides and aldehydes have an improved compatibility and solubility with other aromatic components than those obtained from aromatic primary amines. When preparing condensation products of high molecular weight it is advisable to employ the aromatic compounds produced from secondary amines concurrently with the aromatic compounds produced from primary amines. By so mixing the aromatic compounds it is possible to vary within wide limits the solubility of the resulting condensation products. The compatibility of the condensation products with other materials can also be adjusted by varying the group R' bonded to the nitrogen atom of the aromatic secondary amine. The compatibility of the condensation product obtained is improved with an increase in the number of carbon atoms in the group R'.

The aromatic hydroxyl terminated polyhydroxy condensation compounds may be then reacted with organic diisocyanates and organic polyisocyanates. The aromatic polyhydroxy condensation compounds may be reacted alone with organic polyisocyanates or reacted in admixture with other known suitable compounds containing terminal hydroxyl groups. The aromatic polyhydroxy condensation compounds produced from aromatic primary amines may likewise be reacted alone or in admixture with the aromatic polyhydroxy condensation compounds produced from aromatic secondary amines. Moreover, the aromatic polyhydroxy condensation compounds produced from aromatic secondary amines may be reacted alone or in admixture with the aromatic polyhydroxy condensation compounds produced from aromatic primary amines. Other suitable aromatic polyhydroxy compounds containing terminal hydroxyl groups may also be used in admixture with the novel aromatic polyhydroxy condensation compounds of the present invention. Branched and linear hydroxy terminated polyesters, branched and linear hydroxy terminated polyethers, branched and linear hydroxyl terminated polyacetals are examples of such suitable hydroxyl terminated polyhydroxy compounds. Favorable results are especially obtained when polyesters are admixed with the novel polyhydroxy condensation compounds of the present invention.

The polyhydroxy condensation compounds are reacted in a manner known per se with organic diisocyanates and organic polyisocyanates to give various types of polyurethane plastics. The reaction of the polyhydroxy condensation compounds and the organic polyisocyanates may be carried out by reacting an excess of organic polyisocyanate calculated on the number of hydroxyl groups of the polyhydroxy condensation product. A cross-linking agent such as, for example, water, alkylene glycol, amine or an amino alcohol may be added simultaneously or subsequently. Cellular polyurethanes having a low specific weight are obtained by using water as the cross-linking agent. The reaction with the organic polyisocyanate may be carried out in the presence of reaction accelerators such as, tertiary amines, if necessary. The presence of tertiary nitrogen atoms in the molecule also has an advantageous effect on the reaction of the polyhydroxy condensation product with the organic polyisocyanate. The reaction accelerating influence of the tertiary nitrogen atom is shown in a particularly advantageous manner when water is present. When water is present cellular polyurethanes having an extraordinarily uniform pore structure are obtained. This extraordinarily uniform pore structure is attributable to the foaming being controlled by the tertiary nitrogen atom. This has been seen particularly useful in those cases where strongly branched polyhydroxy compounds were formerly used such as in producing rigid cellular polyurethanes having a high resistance to deformation under heat. The novel condensation products of the present invention have been used to produce rigid cellular polyurethanes which have a uniform pore structure, high resistance to deformation under heat and above all a high resistance to hydrolysis.

According to another process of the invention the novel polyhydroxy condensation products may be reacted with less than enough organic polyisocyanate to react with all of the reactive groups present calculated on the number of existing hydroxyl groups. Suitable tertiary amines which contain reactive groups capable of reacting with an isocyanate group may be added at the same time. Examples of such suitable tertiary amines are, for example, methyl diethanol amine and triethanol amine. These tertiary amines become incorporated into the isocyanate-polyhydroxy condensation addition product. The hydroxy terminated isocyanate modified condensation products thus obtained may be further reacted with additional polyisocyanate and if necessary, cross-linking agents may be concurrently used.

The polyurethane plastics produced according to the present invention are characterized by a high resistance to hydrolysis. The high resistance to hydrolysis may be attributed to the fact that no saponifiable linkages are present in the condensation compounds which contain hydroxyl groups and are used in the present invention. It is also mentioned that as the number of the linked molecular units is altered, the chain length of the aliphatic polyether elements carrying hydroxyl groups, the property diagram of the resulting polyurethane plastics can be varied as the result. As, for example, when the chain is lengthened in the manner specified, an improvement results in, for example, the impact bending strength of the rigid polyurethane plastics obtained after reacting with organic polyisocyanates.

The condensation products obtained from secondary amines have a greater compatibility with organic polyisocyanates than those condensation products obtained from primary aromatic amines. As a result, the homogeneous mixing of the reactants is facilitated, especially in mechanical mixing, when the homogeneous mixing must be effected in the shortest possible time. The present process can therefore be used with particular success in cases where highly branched polyhydroxy compounds have to be used as starting materials to react with organic polyisocyanates as, for example, in making hard foam materials. The present process can be carried out mechanically without any difficulty and hard foam materials of uniform pore structure, high thermal stability and good resistance to hydrolysis are thereby obtained.

Any suitable alkylene oxide may be used in the invention. Examples of such suitable oxyalkylation agents are, for example, ethylene oxide, propylene oxide.

Any suitable aromatic primary and secondary amine may be used in the invention. Such suitable aromatic primary and secondary amines are, for example, toluidine, xylidine, 2,6-diethyl aniline, cyclohexyl toluidine, chloroaniline, 4-amino-diphenyl ether and its chlorinated products, phenylene diamine, 4,4'-diaminodiphenyl methane, triaminotriphenyl methane, alpha-naphthylamine, beta-naphthylamine, 1,5- and 1,8-diaminonaphthalene, N-ethyl aniline, N-butyl aniline, N-cyclohexyl aniline, N,N'-dimethyl-4,4'-diamino-dimethyl diphenyl methane, N-methyl-alpha-amino-naphthalene, N - methyl - beta - amino-naphthalene and N,N'-dimethyl-1,8-diaminonaphthalene or their isomeric mixtures, and the like.

Any suitable aldehyde may be used in the invention. Such suitable aldehydes are, for example, formaldehyde which can be used either in an aqueous solution or as paraformaldehyde, chloral, benzaldehyde, butyraldehyde, acetaldehyde, furfural, alpha-ethyl-beta-propyl-acrolein, 3-hydroxy-2-dimethyl-propionaldehyde-1, and the like.

Any suitable acid catalyst may be used in the invention. Such suitable acid catalysts are, for example, p-toluene sulphonic acid, hydrochloric acid, phosphoric acid, sulphuric acid, zinc chloride, oxalic acid, formic acid and the like. The acid catalysts are generally used in quantities of from about 0.1 to about 5 percent by weight based on the weight of the reaction mixture, although in some cases smaller or larger quantities may be used.

Any suitable basic catalyst may be used in the invention. Such suitable basic catalysts are, for example, sodium, sodium hydroxide, potassium hydroxide, trimethylamine, dimethyl benzyl amine and the like. The basic catalysts are generally used in quantities of from about 0.1 to about 1 percent by weight based on the weight of the reaction mixture, although in some cases smaller or larger quantities may be used.

Any suitable organic diisocyanate and organic polyisocyanate may be used in the invention. Such suitable organic isocyanates are, for example, hexamethylene diisocyanate, diphenyl methane diisocyanate, p-phenylene diisocyanate, 4,4'-diphenyl methane diisocyanate, 1,5-naphthalene diisocyanate, benzidine diisocyanate, toluylene diisocynate and mixtures thereof and the like. If toluylene diisocyanate is to be used, a convenient method of adding it is in the form of the dimer, such as, for example, the dimer of 2,4 toluylene diisocyanate. Organic polyisocyanates may also be used in the form of blocked or masked organic diisocyanates which liberate reactive isocyanate groups when heated. The masked isocyanates may be prepared by reacting an organic diisocyanate, such as, for example, toluylene-2,4-diisocyanate or 1,5-naphthalene diisocyanate or any other suitable organic diisocyanate with a phenol, naphthol, aromatic amine, oxine, imide, or other suitable compound. Also to be mentioned are the reaction products of an excess of organic polyisocyantes which is reacted with a dihydric or polyhydric alcohol, polyesters or polyethers of low molecular weight and which contain terminal hydroxyl groups to produce a compound having about two isocyanate groups to each hydroxyl group. It is also pointed out that the polyhydroxy compound used in the present invention may also be used as a compound containing hydroxyl groups. Organic diisocyanates containing urethdione groups may also be used as, for example, a compound having the formula:

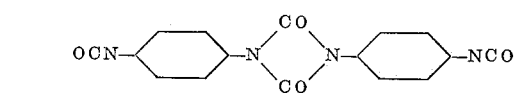

as well as trimeric diisocyanates containing isocyanuric acid rings. Urethdione diisocyanates and diisocyanates comprising urethane groups or mixtures thereof with monomeric diisocyanates and the like may also be used.

Any suitable organic hydroxyl terminated polyhydroxy compound may be used in admixture with the hydroxyl terminated polyhydroxy condensation compounds. Such suitable polyhydroxy compounds are, for example, polyhydric alcohols, such as butane-diol, trimethylol propane or the oxyalkylated amines described above, linear or branched hydroxyl terminated polyesters, linear or branched hydroxyl terminated polyethers, linear or branched hydroxyl terminated polythioethers and linear or branched hydroxyl terminated polyacetals and the like.

Because of their good mechanical properties and excellent resistance to hydrolysis the polyurethane plastics prepared by the process of the invention are especially suitable for the production of technical articles, for example, cellular polyurethanes, coatings, foils, tubes, tires, and castable items and the like.

In order to better describe and further clarify the invention, the following are specific embodiments thereof:

*Example 1*

About 714 g. (2 mols) of hexa-oxyethyl aniline, obtained by reaction of about 93 g. of aniline, about 0.1 g. of sodium and about 264 g. of ethylene oxide at from about 130° C. to about 150° C., are mixed with about 72 g. of paraformaldehyde and after adding about 10 g. of p-toluene sulphonic acid while stirring and passing carbon dioxide over the reaction mixture is heated for about 2 hours at from about 80° C. to about 90° C. The water liberated during this time is distilled off. A vacuum is then applied gradually and the temperature raised over the course of about 1–2 hours to from about 120° C. to about 130° C. after about 25 cc. of water altogether have been liberated, the condensation reaction is stopped. The condensation product formed is a highly viscous yellowish-red oil having an OH number of about 269.

*Example 2*

About 1076 g. (4 mols) of tetra-oxyethyl aniline, obtained from reacting about 372 g. of aniline, about 0.4 g. of sodium and about 704 g. of ethylene oxide at from about 130° C. to about 150° C., are mixed with about 140 g. of paraformaldehyde and condensed in the manner indicated in Example 1. After adding about 15 cc. of concentrated hydrochloric acid, condensation is stopped. After about 54 cc. of water have distilled over, the reaction is stopped. The condensation product which remains is a yellow highly viscous oil having an OH number of about 360.

*Example 3*

About 742 g. (2 mols) of hexa-oxyethyl-o-toluidine are condensed with about 70 g. of paraformaldehyde in the manner indicated in the preceding examples, after adding about 8 cc. of concentrated hydrochloric acid. A dark-colored highly viscous paste, having an OH number of about 316, is obtained.

Example 4

About 538 g. of tetra-oxyethyl aniline, about 85 g. of paraformaldehyde and about 75 g. of N-phenyl glycine are slowly heated to about 90° C. in an atmosphere of carbon dioxide. After about 1 hour the paraformaldehyde has been dissolved. A vacuum is then applied gradually and the temperature raised over the course of from about 1 to about 2 hours to a temperature of from about 90° C. to about 100° C. at a vacuum of about 12 mm. of mercury. The water liberated during this time is distilled off. The condensation product thus formed is a viscous yellowish-red oil having an OH number of about 294 and an acid number of about 24. About 43 cc. of water have been split off.

About 538 g. of tetra-oxyethyl aniline, about 75 g. of paraformaldehyde and about 25 g. of N-phenyl glycine are reacted under the same conditions. After condensation for about five and one-half hours at a temperature of about 90° C. and a vacuum of about 12 mm., about 28 cc. of water are liberated. A viscous oil is obtained having an OH number of about 347 and an acid number of about 11.2.

About 1076 g. of tetra-oxyethyl aniline, about 145 g. of paraformaldehyde and about 40 g. of N-phenyl glycine are reacted under the same conditions as above. After condensation for about 4 hours at a temperature of from about 90° C. to about 100° C. and a vacuum of about 12 mm. of mercury, about 65 cc. of water are liberated. A viscous yellowish-red oil is obtained having an OH number of about 336 and an acid number of about 5.6.

Example 5

About 538 g. of tetra-oxyethyl aniline, about 75 g. of paraformaldehyde and about 30 g. of methyl phenyl glycine are reacted under the conditions described in Example 4. After condensation for about 4 hours at a temperature of about 90° C. and a vacuum of about 12 mm. of mercury, about 30 cc. of water are split off. A viscous yellowish-red oil is obtained. The oil has an OH number of about 330 and an acid number of about 1.2.

If the methyl phenyl glycine is replaced by the same amount of aniline-bis-acetic acid without changing the other reaction conditions about 33 cc. of water are liberated within about 3 hours by condensation at a temperature of about 90° C. and a vacuum of about 12 mm. of mercury. The condensation product thus obtained is a viscous oil having an OH number of about 325 and an acid number of about 22.4.

Example 6

About 538 g. of tetra-oxyethyl aniline, about 70 g. of paraformaldehyde and about 12 g. of 5-amino-benzene-1,3-dicarboxylic acid are reacted under the conditions of Example 4. After condensation for about 5 hours at a temperature of about 90° C. at a vacuum of about 12 mm. of mercury, about 28 cc. of water are split off. A yellowish-red oil is obtained having an OH number of about 347 and an acid number of about 8.4.

If the 5-amino-benzene-1,3-dicarboxylic acid is replaced by the same amount of m-amino benzoic acid without changing the other reaction conditions, about 21 cc. of water are split off within about 5 hours. The resulting condensation product is a viscous oil having an OH number of about 364 and an acid number of about 11.2.

Without changing the reaction conditions the 5-aminobenzene-1,3-dicarboxylic acid is replaced by about 5 g. of m-sulfanilic acid. Within about 5 hours about 20 cc. of water are liberated from the reaction mixture. The condensation product which is obtained is a viscous oil having an OH number of about 364 and an acid number of about 2.8.

Example 7

A mixture of about 538 g. (2 mols) of tetra-oxyethyl aniline and about 151 g. (1 mol) of N-methyl hydroxyethyl aniline are heated to a temperature of from about 80° C. to about 90° C. After adding about 100 g. of paraformaldehyde and while passing carbon dioxide over the reaction mixture, about 8 g. of phosphoric acid are slowly added. A slightly exothermic reaction takes place and the aldehyde gradually dissolves. After a reaction period of from about 1–2 hours at a temperature of from about 80° C. to about 90° C., vacuum is then gradually applied and the condensation reaction is continued until water no longer distills off and the required viscosity is reached. In the present example about 25 cc. of water are liberated during the reaction. The condensation product is a viscous dark oil which has an OH number of about 369 and a viscosity of about 496 cp./75° C.

Example 8

About 604 g. (4 mols) of N-methyl hydroxyethyl aniline and about 140 g. of paraformaldehyde are gradually heated to a temperature of from about 80° C. to about 90° C. and about 8 g. of phosphoric acid are added. The aldehyde gradually dissolves in the reaction mixture. After about 1 to about 2 hours, a slight vacuum is applied and the water liberated during the reaction is removed. About 28 cc. of water is liberated in the reaction. A viscous dark oil having an OH number of about 367 is obtained.

Example 9

About 538 g. (2 mols) of tetraoxyethyl aniline, about 193 g. (1 mol) of N-butylhydroxyethyl aniline and about 100 g. of paraformaldehyde are heated to a temperature of from about 80° C. to about 90° C. after adding about 8 g. of p-toluene sulphonic acid. As soon as a clear solution has formed, a vacuum is gradually applied and the water formed during the reaction is distilled off at the same temperature. About 23 cc. of water is liberated during the reaction. The OH number of the resulting dark viscous oil is about 361.

Example 10

About 100 g. of a condensation product prepared according to Example 2 by condensing about 714 g. of hexaoxyethyl aniline with about 72 g. of paraformaldehyde after adding about 10 cc. of concentrated hydrochloric acid. The condensation product having an OH number of about 269, is then mixed with a mixture of about 1 g. of dimethyl benzylamine and about 5 g. of a 54% aqueous solution of the sodium salt of sulphonated castor oil. This mixture is stirred with about 117 g. of toluylene diisocyanate and placed in a mold. A non-shrinking foam material is obtained, having a cellular structure and the following mechanical properties:

| | | |
|---|---|---|
| Unit weight | kg./cu. m | 40 |
| Compressive strength | kg./cm.$^2$ | 1.89 |
| Impact strength | kg./cm | 0.12 |
| Hot-bending strength | degrees | 130 |

Example 11

A mixture of about 50 g. of the condensation product described in Example 10 and about 50 g. of a polyester obtained from condensing about 5.1 mols of adipic acid, about 1 mol of phthalic anhydride and about 0.4 mol of hexanetriol and having an OH number of about 296, is mixed with a mixture of about 1 g. of dimethyl benzylamine and about 5 g. of a 54% aqueous solution of the sodium salt of sulphonated castor oil. About 101 g. of toluylene diisocyanate is then added while stirring thoroughly and the reaction mixture is placed in molds. A non-brittle fine-pored foam material is obtained having the following properties:

| | | |
|---|---|---|
| Unit weight | kg./cu. m | 40 |
| Compressive strength | kg./cm.$^2$ | 1.49 |
| Impact strength | kg./cm | 0.13 |
| Hot-bending strength | degrees | 146 |
| Water absorption | percent by volume | 3 |

Example 12

A mixture of about 50 g. of a condensation product produced from about 538 g. of tetra-oxyethyl aniline, about 72 g. of paraformaldehyde and about 8 g. of p-toluene sulphonic acid and having an OH number of about 370 with about 50 g. of a hydroxyl terminated polyester produced from about 1 mol of adipic acid, about 2 mols of phthalic anhydride, about 1 mol of oleic acid and about 5 mols of trimethylol propane and having an OH number of about 380 and an acid number of about 0.75, is then mixed with about 1 g. of bis-(diethylaminoethanol)-adipate and about 5 g. of a 54% aqueous solution of the sodium salt of sulphonated castor oil. The mixture is thoroughly stirred with about 110 g. of toluylene diisocyanate and placed in molds. A fine-pored non-shrinking foam material is obtained, having the following properties:

| | |
|---|---|
| Unit weight _____kg./cu. m__ | 39 |
| Compressive strength _____ kg./cm.²__ | 1.93 |
| Impact strength _____ kg./cm__ | 0.13 |
| Hot-bending strength _____ degrees__ | 140 |
| Water absorption _____ percent by volume__ | 2 |

Example 13

About 100 g. of a condensation product having an OH number of about 370 and prepared from about 538 g. of tetra-oxyethyl aniline, about 72 g. of paraformaldehyde and about 10 g. of p-toluene sulphonic acid are mixed with about 1 g. of dimethyl benzylamine and about 5 g. of a 54% aqueous solution of the sodium salt of sulphonated castor oil. This mixture is thoroughly stirred with about 117 g. of toluylene diisocyanate and then placed in molds. A non-shrinking foam material with a fine pore structure is obtained. It has the following properties:

| | |
|---|---|
| Unit weight _____ kg./cu. m__ | 25 |
| Compressive strength _____ kg./cm.²__ | 1.4 |
| Impact strength _____ kg./cm__ | 0.11 |
| Hot-bending strength _____ degrees__ | 147 |

Example 14

About 100 grams of an aromatic polyhydroxy compound with a hydroxyl number of about 341 and prepared according to Example 7 by the condensation of about 538 g. of tetra-oxyethyl aniline and about 151 g. of methyl hydroxyethyl aniline with about 100 g. of paraformaldehyde in the presence of about 7 g. of phosphoric acid are mixed on a mechanical mixer with a mixture of about 0.8 g. of dimethyl benzylamine and about 4 g. of a 46% aqueous solution of the sodium salt of sulphonated castor oil and also with about 80 g. of toluylene diisocyanate. A fine-pored foam material which has the following physical properties is obtained.

| | |
|---|---|
| Unit weight _____ kg./cu. m__ | 31 |
| Compressive tsrength _____ kg./cm.²__ | 1.63 |
| Impact strength _____cm. kg./cm.²__ | 0.09 |
| Hot-bending strength _____° C__ | 130 |

Example 15

About 100 grams of the condensation product described in Example 14 are mixed with a mixture of about 0.8 g. of permethylated diethylene triamine and about 4 g. of a 46% aqueous solution of the sodium salt of sulphonated castor oil and also about 83 g. of toluylene diisocyanate containing a small proportion of toluylene diisocyanate polymerized by the process disclosed in German patent specification No. 1,013,869 as laid open to inspection and the reaction mixture is then poured into a mold. A uniform foam material which has the following physical properties is formed:

| | |
|---|---|
| Unit weight _____ kg./cu. m__ | 41 |
| Compressive strength _____ kg./cm.²__ | 2.62 |
| Impact strength _____ cm. kg./cm.²__ | 0.13 |
| Hot-bending strength _____° C__ | 153 |

Example 16

About 100 g. of a condensation product prepared by the process disclosed in Example 7 from about 538 g. of tetra-oxyethyl aniline, about 75.5 g. of N-methyl hydroxyethyl aniline and about 85 g. of paraformaldehyde and having an OH number of about 330 are mixed as described in Example 14 with a mixture of about 1 g. of dimethyl benzylamine and about 4 g. of a 46% aqueous solution of the sodium salt of sulphonated castor oil and also about 73 g. of toluylene diisocyanate, and poured into a mold. The result is a hard foam material with uniform fine pores, the said material having the following physical properties:

| | |
|---|---|
| Unit weight _____kg./cu. m__ | 32 |
| Compressive strength _____kg./cm.²__ | 1.6 |
| Impact strength _____cm. kg./cm.²__ | 0.13 |
| Hot-bending strength _____° C__ | 122 |

It is to be understood that any of the aromatic primary and secondary amines or basic catalyst or alkylene oxides or aldehydes or acid catalyst or polyhydroxy compounds or organic polyisocyanates or cross-linking agents disclosed as operable herein can be substituted in the foregoing working examples for those specific compounds used.

Although the invention has been described in considerable detail in the foregoing examples for the purpose of illustration, it is to be understood that such detail is solely for this purpose and that variations can be made therein by those skilled in the art without departing from the spirit and scope of the invention except as set forth in the claims.

We claim:

1. A process for making a polyurethane which comprises:
   (a) reacting an organic polyisocyanate with a polyhydroxyl condensation compound;
   (b) said polyhydroxyl condensation compound having been obtained by a process which consists of mixing and reacting in the presence of a catalytic amount of a catalyst selected from the group consisting of acid catalysts and basic catalysts, an aldehyde with a compound selected from the group consisting of

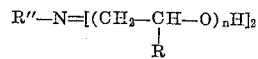

and

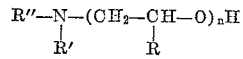

wherein
   R is a member selected from the group consisting of hydrogen and a methyl group;
   R' is a member selected from the group consisting of alkyl radicals having from 1 to 4 carbon atoms, cyclohexyl and hydrogen;
   R'' is an aryl radical selected from the group consisting of naphthyl, phenyl and biphenyl; and
   n is a whole number having a value of from 1 to 10;
   (c) said aldehyde selected from the group consisting of paraformaldehyde and monoaldehydes having from 1 to 8 carbon atoms.

2. The process of claim 1 wherein a second hydroxyl-terminated polyhydroxyl compound is present during the reaction of said organic polyisocyanate and said polyhydroxyl condensation compound, said second polyhydroxyl compound selected from the group consisting of hydroxyl terminated polyesters, polyethers and polyacetals.

3. The process of claim 1 wherein said condensation compound is obtained by a process which comprises reacting paraformaldehyde with hexa-oxyethyl aniline.

4. The process of claim 1 wherein said condensation compound is obtained by a process which comprises reacting paraformaldehyde with tetra-oxyethyl aniline.

5. The process of claim 1 wherein said condensation compound is obtained by a process which comprises reacting paraformaldehyde with hexa-oxyethyl-o-toluidine.

6. The process of claim 1 wherein said condensation compound is obtained by a process which comprises reacting paraformaldehyde with N-methyl hydroxyethyl aniline.

7. A polyurethane plastic prepared by a process which comprises:
(a) reacting an organic polyisocyanate with a polyhydroxyl condensation compound;
(b) said polyhydroxyl condensation compound having been obtained by a process which consists of mixing and reacting in the presence of a catalytic amount of a catalyst selected from the group consisting of acid catalysts and basic catalysts, an aldehyde with a compound selected from the group consisting of

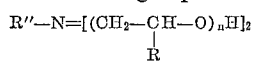

and

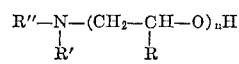

wherein
R is a member selected from the group consisting of hydrogen and a methyl group;
R' is a member selected from the group consisting of alkyl radicals having from 1 to 4 carbon atoms, cyclohexyl and hydrogen;
R'' is an aryl radical selected from the group consisting of naphthyl, phenyl and biphenyl; and
$n$ is a whole number having a value of from 1 to 10;
(c) said aldehyde selected from the group consisting of paraformaldehyde and monoaldehyde having from 1 to 8 carbon atoms.

8. The composition of claim 7 wherein a second polyhydroxyl compound is present during the reaction of said organic polyisocyanate and said polyhydroxyl condensation compound wherein said second polyhydroxyl compound is a hydroxyl terminated polyester.

References Cited in the file of this patent

UNITED STATES PATENTS

| | | |
|---|---|---|
| 2,161,322 | Steindorff et al. | June 6, 1939 |
| 2,432,023 | Lecher et al. | Dec. 2, 1947 |
| 2,511,544 | Rinke et al. | June 13, 1950 |
| 2,535,380 | Adams et al. | Dec. 26, 1950 |
| 2,843,569 | Benning | July 15, 1958 |
| 2,962,455 | Hostettler et al. | Nov. 29, 1960 |
| 2,962,524 | Hostettler et al. | Nov. 29, 1960 |

FOREIGN PATENTS

| | | |
|---|---|---|
| 206,295 | Australia | Feb. 10, 1955 |